March 27, 1962  L. COMORAU  3,026,748
DRILL POSITIONING JIG
Filed Sept. 12, 1960  2 Sheets-Sheet 1

INVENTOR.
LEO COMORAU
BY Albert F. Kronman
ATTORNEY

March 27, 1962 L. COMORAU 3,026,748
DRILL POSITIONING JIG
Filed Sept. 12, 1960 2 Sheets-Sheet 2
FIG. 3
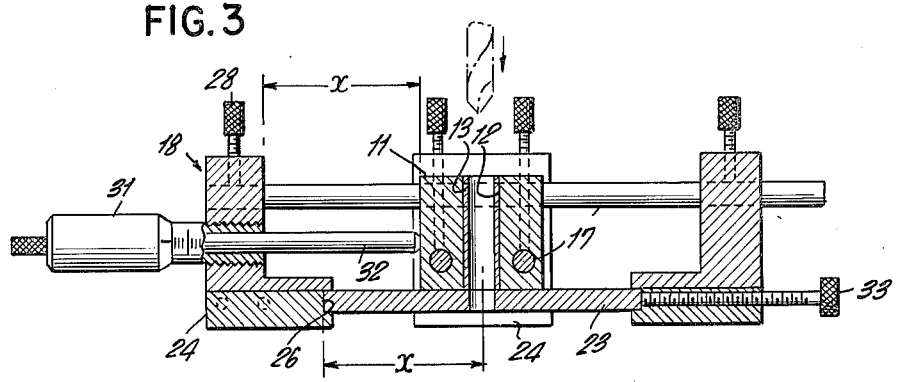
FIG. 4
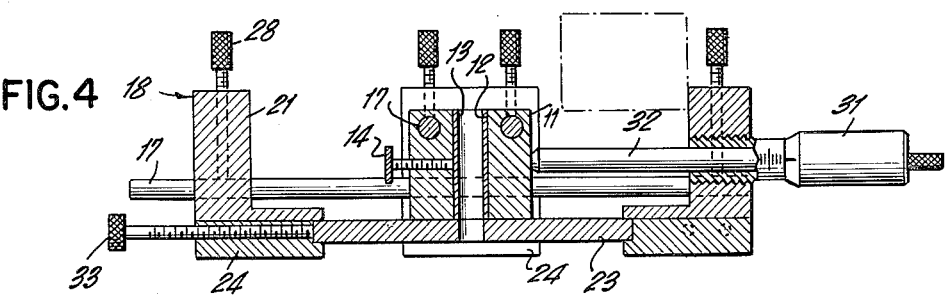
FIG. 5
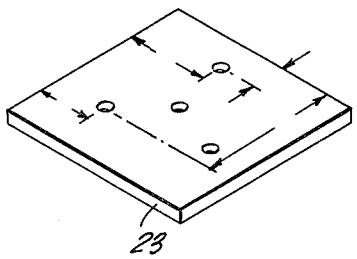
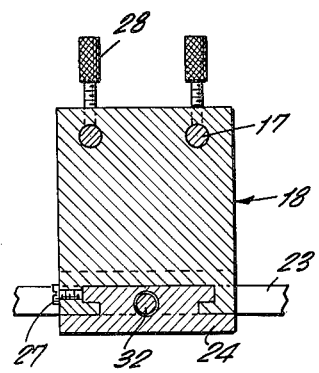
FIG. 6
INVENTOR.
LEO COMORAU
BY Albert F. Krouman
ATTORNEY .# United States Patent Office 3,026,748
Patented Mar. 27, 1962

3,026,748
DRILL POSITIONING JIG
Leo Comorau, 36—27 32nd St., Long Island City, N.Y., assignor of fifty percent to Allen A. Surrey, New York, N.Y.
Filed Sept. 12, 1960, Ser. No. 55,488
9 Claims. (Cl. 77—62)

This invention relates to jigs and more particularly to adjustable jigs for accurately locating and guiding drills, punches and other cutting tools.

It is well known to employ jigs for the purpose of drilling holes at specific locations in material. Centering jigs have also been used for the purpose of putting a hole in the precise geometric center of a work part. In addition, drilling jigs have been used for the purpose of assuring accurate drilling operations. However, when a large number of holes are to be accurately located on a work part, much time is spent in laying out the precise location of the holes to be drilled prior to the actual drilling operation. In order to achieve the accurate layout step, expensive machinery and much time is required.

Accordingly, it is an object of the present invention to provide a drilling jig capable of precise adjustment whereby a plurality of holes may be accurately located and drilled in a work part.

Another object of the present invention is to provide an improved drilling jig which will hold the work part to be drilled and guide the drill and cutting tool into the material.

Still another object of the present invention is to provide an adjustable jig having accurate bearing faces whereby the tool guiding portion of the jig may be positioned with great precision.

An object of the present invention is to provide a jig which will accommodate a plurality of drill sizes and which may be adjusted to fit a large variety of work part dimensions.

A further object of the present invention is to provide a jig which may be adjusted with respect to the work parts after the work part is placed therein.

Still another object of the present invention is to provide a drilling jig which will enable a workman to accurately locate and drill holes without the customary layout operation.

A feature of the present invention is its accurately machined guide block which facilitates hole location.

Another feature of the present invention is its spaced setting block structure whereby an accurate reference surface is provided from which the guide block can be positioned.

Still another feature of the present invention is its work part grasping structure for slidably holding the work part until the guide block has been accurately positioned.

A featured of the present invention is its use of micrometer devices in conjunction with a drilling jig for precise location of the guide block.

A further feature of the present invention is its use of pairs of spaced rods disposed normal to each other whereby rectilinear motion can be imparted to the guide block without releasing the work parts.

A feature of the present invention is its adjustability to a wide variety of drill sizes and work part dimensions.

The invention consists of the construction, combination and arrangement of parts, as herein illustrated, described and claimed.

In the accompanying drawings, forming a part hereof is illustrated one form of embodiment of the invention, in which drawings similar reference characters designate corresponding parts and in which:

FIGURE 3 is a sectional view taken on line 3—3 of FIGURE 2 looking in the direction of the arrows.

FIGURE 4 is a sectional view taken on line 4—4 of FIGURE 2 looking in the direction of the arrows.

FIGURE 5 is an isometric view of a drill plate showing the manner in which holes are located with respect to the edges thereof.

FIGURE 6 is a view taken on line 6—6 of FIGURE 2 looking in the direction of the arrows.

Figure 1:
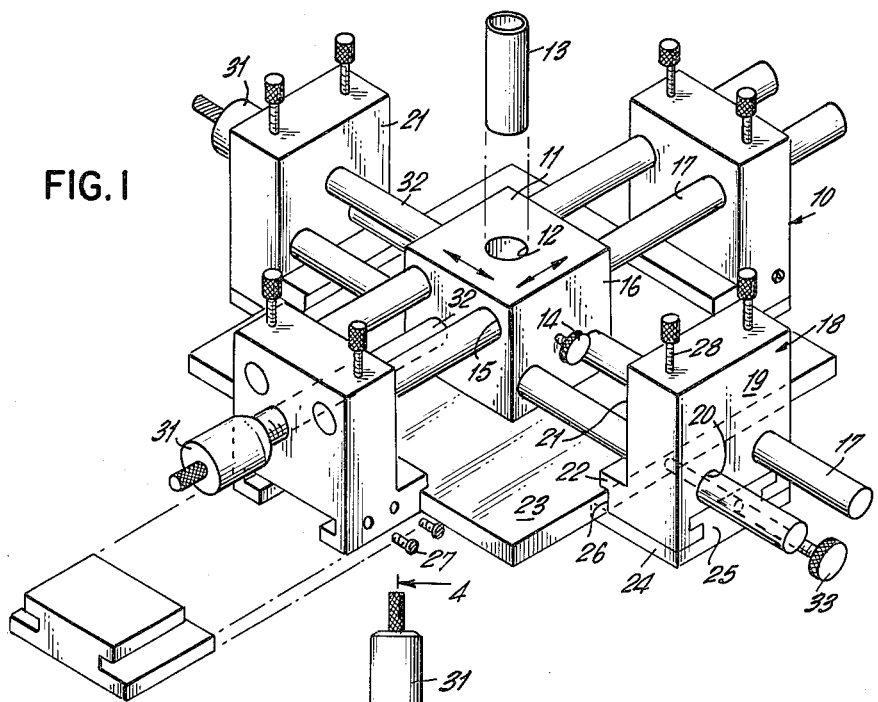
FIGURE 1 is an isometric and partly exploded view of a jig made in accordance with the present invention showing a plate-like work part held therein.
Figure 2:
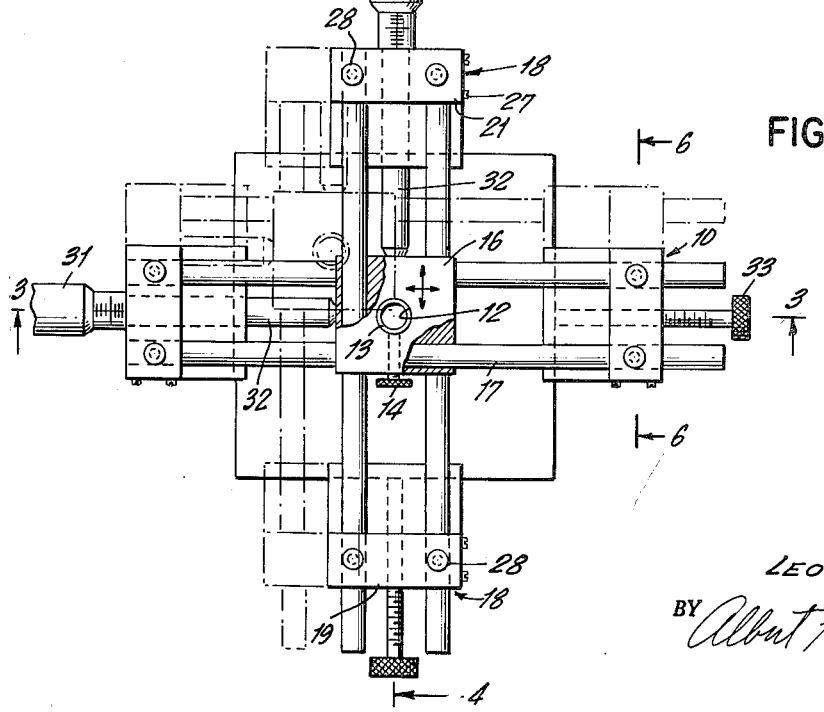
FIGURE 2 is a plan view of the jig shown in FIGURE 1, partly cut away to show the construction of the guide block.

Referring to the drawings and particularly to FIGURES 1 and 2, 10 indicates a jig assembly having a substantially cube-shaped guide block 11 centrally bored as indicated at 12, to receive a drill or other cutting tool (not shown). The bore 12 is of a dimension to receive a bushing 13 therein which bushing is held in place within the bore 12 by means of a small set screw 14. It will be seen that by using bushings of varying wall thicknesses a wide variety of cutting tool sizes may be accommodated and guided by the guide block 11.

The guide block 11 is provided with parallel spaced horizontal bores 15 which traverse the block on either side of the vertical bore 12. The bores 15 comprise two sets, one of which is disposed above the other as shown in FIGURE 1. The first set of bores are parallel to one of the faces 16 of the guide block 11. The second set of bores 15 are normal to the first set of bores and parallel to a second face of the block 11 which face is at right angles to the plane of the first set of bores.

Elongated rods 17 are freely carried within the bores 15 of the guide block 11. The rods 17 extend outwardly of the guide blocks and are of a length which will enable them to extend beyond the work part to be drilled.

A work part receiving and guide block positioning member hereinafter referred to as a setting block 18 is slidably carried on the free ends of each pair of rods 17. The setting blocks 18 are formed with an upstanding portion 19 which is bored as indicated at 20 to receive the rods 17. The front of the upstanding portion 19 is accurately machined to provide a bearing face 21 from which hole positioning dimensions can be measured. A small stepped portion 22 is provided near the bottom of the setting block 18 and serves to engage the top surface and edge of the work part 23. The work part 23 has been illustrated as a rectangular plate in the present embodiment but it is to be understood that other rectangular shapes may be received within the jig 10 merely by modifying the shape of the setting block 18.

A support plate 24 is inserted into the bottom of the setting block 18 by means of the dovetailed arrangement indicated at 25. The support plate underlies the work part 23 and forms the bottom of a work receiving slot 26 which extends across the bottom of the setting block 18. The flat surface of the slot 26 which bears against the edge of the work part 23 is spaced from the bearing face 21 of the setting block a distance equal to the distance from the face 16 of the drill block to the center of the vertical bore 12. It will be seen that any movement of the face 16 from the bearing face 21 on the setting block 18 will displace the drill or cutting tool an equal amount from the edge of the work part 23.

The support plate 24 may be secured in place within the setting block 18 by means of small screws 27. The setting blocks 18 may be secured to the rods 17 by means of the set screws 28 which are threadably received within the upstanding portion 19 of the setting blocks 18 and which traverse the said blocks and communicate with the bores 20 in which the rods 17 are received.

When it is desired to use the drilling jig hereinabove described the work part 23 is slipped within the slots 26 in the setting blocks 18. Two of the setting blocks 18 which are adjacent to each other and disposed along sides which are normal to each other may be secured to the ends of the rods 17 as indicated at 29 and 30. The remaining two setting blocks 18 are freely held upon the rod 17 whereby the setting blocks 18 may be slid in either direction along the edges of the work part 23 as indicated by the dashed lines and also the arrows on the guide block 11 in FIGURE 2. Assuming that a hole is to be located in the work part 23 one inch from one edge thereof and ½ inch from the adjacent edge, the operator merely backs off the micrometer spindle 32 and inserts a 1 inch shim or block between the face of the guide block 11 and the opposed bearing face 21 on the setting block 18. With the spaced shim or block (indicated in dashed lines in FIGURE 4) in position, the setting blocks 18 are slid along the edge of the work part 23 until the guide block 11 comes to bear against a ½ inch block (not shown) interposed between the face of the guide block 11 and its opposed bearing face 21 on the setting block 18 which was slipped over the adjacent edge of the work part 23. The guide block 11 will thus be accurately located one inch in from one edge and ½ inch in from the adjacent edge. The set screws 28 can thereupon be tightened upon the rods 17 to lock the entire jig in place upon the work part 23. Thereafter, the drill or cutting tool can be lowered through the bushing 13 and into the work part 23. By repeating this operation with different size blocks or shims it is possible to locate and drill with great accuracy several holes in the work part 23 before removing it from the jig 10.

In addition to the use of accurately machined and ground blocks for spacing purposes, it is within the purview of the present invention to provide micrometers 31, carried within the setting block 18 and extending therethrough with their spindles 32 disposed in the direction of the guide blocks 11. The micrometer spindles 32 may be brought to bear directly upon the guide blocks 11 as shown in FIGURES 3 and 4, or they may be brought to bear against a shim or measuring block for the purpose of increasing or decreasing the dimension by a few thousandths of an inch.

Where a plurality of work parts are to be drilled with a single accurately positioned hole the work parts may be removed from the jib by loosening screws 27 and sliding the support plates 24 away from the stepped portion 22 of the setting blocks 18. The work part 23 will thereupon drop out of the jig and may be replaced by undrilled members without disturbing the setting of the guide block 11.

As a further guarantee against the setting blocks 18 slipping once the jig has been accurately set up, small screws 33 have been provided in the support plates 24 which screws bear directly against the edge of the work part 23 to add additional friction at this point. The screws 33 will only be tightened after the set screws 28 have secured the setting blocks 18 to the rods 17.

From the foregoing it will be apparent that there has been provided a drilling jig by means of which holes can be accurately located and drilled, punched or otherwise generated within a work part without the use of complicated tools or time consuming layout operations. The jig is inexpensive, small and adapted to a wide variety of work part sizes. Once set up the jig may be used for a series of drilling operations in successive work parts without loss of accuracy.

Having thus fully described the invention, what is claimed as new and desired to be secured by Letters Patent of the United States, is:

1. A jig for accurately positioning and guiding a tool upon a rectangular work part comprising a substantially cube shaped guide block, a central vertical bore in the guide block, a first pair of spaced horizontal bores on each side of the vertical bore in the guide block traversing the said block and parallel with each other and at least one side of the guide block, a second pair of spaced horizontal bores on each side of the vertical bore in the guide block normal to the first pair of horizontal bores and vertically displaced therefrom, an elongated rod freely disposed within each of the horizontal bores, a setting block slidably carried upon the free ends of each pair of rods, means to support the rectangular work part between the setting blocks, said support means being slidable with respect to the edges of the work part to adjust the location of the guide block upon the work part and means to lock the setting blocks upon the rods to hold the jig and work part in their adjusted relationship.

2. A jig for accurately positioning and guiding a tool upon a rectangular work part comprising substantially cube shaped guide block, flat bearing surfaces on each of the sides of the guide block equidistant from the geometric center thereof, a central vertical bore in the guide block, a first pair of spaced horizontal bores on each side of the vertical bore in the guide block traversing the said block and parallel with each other and at least one side of the guide block, a second pair of spaced horizontal bores on each side of the vertical bore in the guide block normal to the first pair of horizontal bores and vertically displaced therefrom, an elongated rod freely disposed within each of the horizontal bores, a setting block slidably carried upon the free ends of each pair of rods, a bearing surface on each of the setting blocks facing one of the guide block bearing surfaces, means to support the rectangular work part between the setting blocks, said support means being slidable with respect to the edges of the work part to adjust the location of the guide block upon the work part and means to lock the setting blocks upon the rods to hold the jig and work part in their adjusted relationship.

3. A jig according to claim 2 in which the setting block bearing surfaces are outwardly offset from the plane of the edge of the work part a distance equal to the distance from the guide block bearing surface to the center of the vertical bore.

4. A jig for accurately positioning and guiding a tool upon a rectangular work part comprising a substantially cube shaped guide block, flat bearing surfaces on each of the sides of the guide block equidistant from the geometric center thereof, a central vertical bore in the guide block, a first pair of spaced horizontal bores on each side of the vertical bore in the guide block traversing the said block and parallel with each other and at least one side of the guide block, a second pair of spaced horizontal bores on each side of the vertical bore in the guide block normal to the first pair of horizontal bores and vertically displaced therefrom, an elongated rod freely disposed within each of the horizontal bores, a setting block slidably carried upon the free ends of each pair of rods, a bearing surface on each of the setting blocks facing one of the guide block bearing surfaces, a stepped portion at the bottom of each setting block, a work part engaging support plate carried by the stepped portion and a slot formed by the stepped portion and plate, means to support the rectangular work part between the setting blocks, said support means being slidable with respect to the edges of the work part to adjust the location of the guide block upon the work part and means to lock the setting blocks upon the rods to hold the jig and work part in their adjusted relationship.

5. A jig for accurately positioning and guiding a tool upon a rectangular work part comprising a substantially cube shaped guide block, a central vertical bore in the guide block, a first pair of spaced horizontal bores on each side of the vertical bore in the guide block traversing the said block and parallel with each other and at least one side of the guide block, a second pair of spaced horizontal bores on each side of the vertical bore in the guide block normal to the first pair of horizontal bores and vertically displaced therefrom, an elongated rod freely disposed within each of the horizontal bores, a setting block slidably carried upon the free ends of each pair of rods, means to support the rectangular work part between the setting blocks, said support means being slidable with respect to the edges of the work part to adjust the location of the guide block upon the work part, means to accurately locate and position the guide block a designated distance from the edges of the work part and means to lock the setting blocks upon the rods to hold the jig and work part in their adjusted relationship.

6. A jig according to claim 5 in which the positioning means comprises a micrometer carried by at least one of the setting blocks with its spindle extending in the direction of the guide block.

7. A jig for accurately positioning and guiding a tool upon a rectangular work part comprising a substantially cube shaped guide block, flat bearing surfaces on each of the sides of the guide block equidistant from the geometric center thereof, a central vertical bore in the guide block, a first pair of spaced horizontal bores on each side of the vertical bore in the guide block traversing the said block and parallel with each other and at least one side of the guide block, a second pair of spaced horizontal bores on each side of the vertical bore in the guide block normal to the first pair of horizontal bores and vertically displaced therefrom, an elongated rod freely disposed within each of the horizontal bores, a setting block slidably carried upon the free ends of each pair of rods, a bearing surface on each of the setting blocks facing one of the guide block bearing surfaces, a stepped portion at the bottom of each setting block, a work part engaging jaw slidably carried by the stepped portion, means to lock the jaw in place upon the setting block and a slot formed by the stepped portion and jaw, means to support the rectangular work part between the setting blocks, said support means being slidable with respect to the edges of the work part to adjust the location of the guide block upon the work part and means to lock the setting blocks upon the rods to hold the jig and work part in their adjusted relationship.

8. A jig for accurately positioning and guiding a tool upon a rectangular work part comprising a substantially cube shaped guide block, a central vertical bore in the guide block, a first pair of spaced horizontal bores on each side of the vertical bore in the guide block ttraversing the said block and parallel with each other and at least one side of the guide block, a second pair of spaced horizontal bores on each side of the vertical bore in the guide block normal to the first pair of horizontal bores and vertically displaced therefrom, an elongated rod freely disposed within each of the horizontal bores, a setting block slidably carried upon the free ends of each pair of rods, means to support the rectangular work part between the setting blocks, said support means being slidable with respect to the edges of the work part to adjust the location of the guide block upon the work part and means comprising set screws carried by the setting blocks and adapted to bear against the rods therein to lock the setting blocks upon the rods to hold the jig and work part in their adjusted relationship.

9. A jig for accurately positioning and guiding a tool upon a rectangular work part comprising a substantially cube shaped guide block, flat bearing surfaces on each of the sides of the guide block equidistant from the geometric center thereof, a central vertical bore in the guide block, a first pair of spaced horizontal bores on each side of the vertical bore in the guide block traversing the said block and parallel with each other and at least one side of the guide block, a second pair of spaced horizontal bores on each side of the vertical bore in the guide block normal to the first pair of horizontal bores and vertically displaced therefrom, an elongated rod freely disposed within each of the horizontal bores, a setting block slidably carried upon the free ends of each pair of rods, a bearing surface on each of the setting blocks facing one of the guide block bearing surfaces, comprising a stepped portion at the bottom of each setting block, a work part engaging jaw slidably carried by the stepped portion means to lock the jaw in place upon the setting block and a slot formed by the stepped portion and jaw, means to support the rectangular work part between the setting blocks, said support means being slidable with respect to the edges of the work part to adjust the location of the guide block upon the work part, means to accurately locate and position the guide block a desired distance from the edges of the work part and means comprising set screws carried by the setting blocks and adapted to bear against the rods therein to lock the setting blocks upon the rods to hold the jig and work part in their adjusted relationship.

References Cited in the file of this patent

UNITED STATES PATENTS 2,211,634     Baker _____ Aug. 13, 1940